United States Patent
Kuerschner et al.

(10) Patent No.: US 7,552,946 B2
(45) Date of Patent: Jun. 30, 2009

(54) FASTENING DEVICE FOR A STEERING COLUMN MODULE OF A VEHICLE

(75) Inventors: Sven Kuerschner, Woellstein (DE); Joerg Schoenleber, Manubach (DE); Gerd Rudolph, Aspisheim (DE); Hans Peter Kunz, Breitscheid (DE)

(73) Assignee: Delphi Technologies, Inc., Troy, MI (US)

( * ) Notice: Subject to any disclaimer, the term of this patent is extended or adjusted under 35 U.S.C. 154(b) by 442 days.

(21) Appl. No.: 11/228,813

(22) Filed: Sep. 16, 2005

(65) Prior Publication Data

US 2006/0061079 A1  Mar. 23, 2006

(30) Foreign Application Priority Data

Sep. 20, 2004  (DE) .................. 10 2004 045 876

(51) Int. Cl.
*B62D 1/16* (2006.01)
*B62D 15/00* (2006.01)

(52) U.S. Cl. ............... 280/779; 280/771; 280/775; 74/492; 74/493; 74/495; 29/434; 29/453; 29/525.01; 29/894.1

(58) Field of Classification Search .......... 280/771, 280/775, 779; 74/492, 493, 495; 29/434, 29/453, 525.01, 894.1
See application file for complete search history.

(56) References Cited

U.S. PATENT DOCUMENTS

| | | | | |
|---|---|---|---|---|
| 2,189,005 | A * | 2/1940 | Husted | 74/552 |
| 4,268,125 | A * | 5/1981 | Carter | 359/872 |
| 6,293,167 | B1 * | 9/2001 | Latz et al. | 74/493 |
| 6,450,058 | B2 * | 9/2002 | Latz et al. | 74/492 |
| 6,592,148 | B2 * | 7/2003 | Byers et al. | 280/777 |
| 6,612,616 | B2 * | 9/2003 | Budaker et al. | 280/775 |
| 6,807,718 | B2 * | 10/2004 | Lodholz et al. | 29/418 |
| 6,957,595 | B2 * | 10/2005 | Kromer et al. | 74/493 |
| 7,000,949 | B2 * | 2/2006 | Bostic et al. | 280/779 |
| 7,168,741 | B2 * | 1/2007 | Kinme et al. | 280/777 |
| 7,296,332 | B2 * | 11/2007 | Brinker et al. | 29/434 |
| 2001/0042419 | A1 * | 11/2001 | Latz et al. | 74/492 |
| 2002/0088296 | A1 * | 7/2002 | Schroter et al. | 74/492 |
| 2002/0157494 | A1 * | 10/2002 | Matsumoto et al. | 74/492 |
| 2005/0262960 | A1 * | 12/2005 | Cymbal et al. | 74/492 |
| 2006/0108782 | A1 * | 5/2006 | Kanazawa et al. | 280/779 |
| 2006/0117898 | A1 * | 6/2006 | Schneider et al. | 74/492 |
| 2006/0243089 | A1 * | 11/2006 | Cymbal et al. | 74/493 |
| 2006/0261587 | A1 * | 11/2006 | Harris et al. | 280/771 |
| 2007/0039402 | A1 * | 2/2007 | Hebenstreit et al. | 74/492 |
| 2007/0039403 | A1 * | 2/2007 | Manwaring et al. | 74/492 |
| 2007/0113701 | A1 * | 5/2007 | Streng et al. | 74/492 |

(Continued)

FOREIGN PATENT DOCUMENTS

DE  10259167 B3 *  5/2004

*Primary Examiner*—John Q. Nguyen
*Assistant Examiner*—Barry Gooden, Jr.
(74) *Attorney, Agent, or Firm*—Thomas N. Twomey

(57) ABSTRACT

A fastening device for a steering column module of a vehicle includes a housing bottom (30) coupled to an essentially tubular fastening flange (20), which module is mounted on the steering column jacket (10) of a steering spindle. The fastening flange (20) has at least one radially movable arresting block (40, 40'), which, in a fastening position of the fastening flange (20), engages in a corresponding radial recess (12, 12') of the steering column jacket (10).

12 Claims, 3 Drawing Sheets

U.S. PATENT DOCUMENTS

Figure 1:
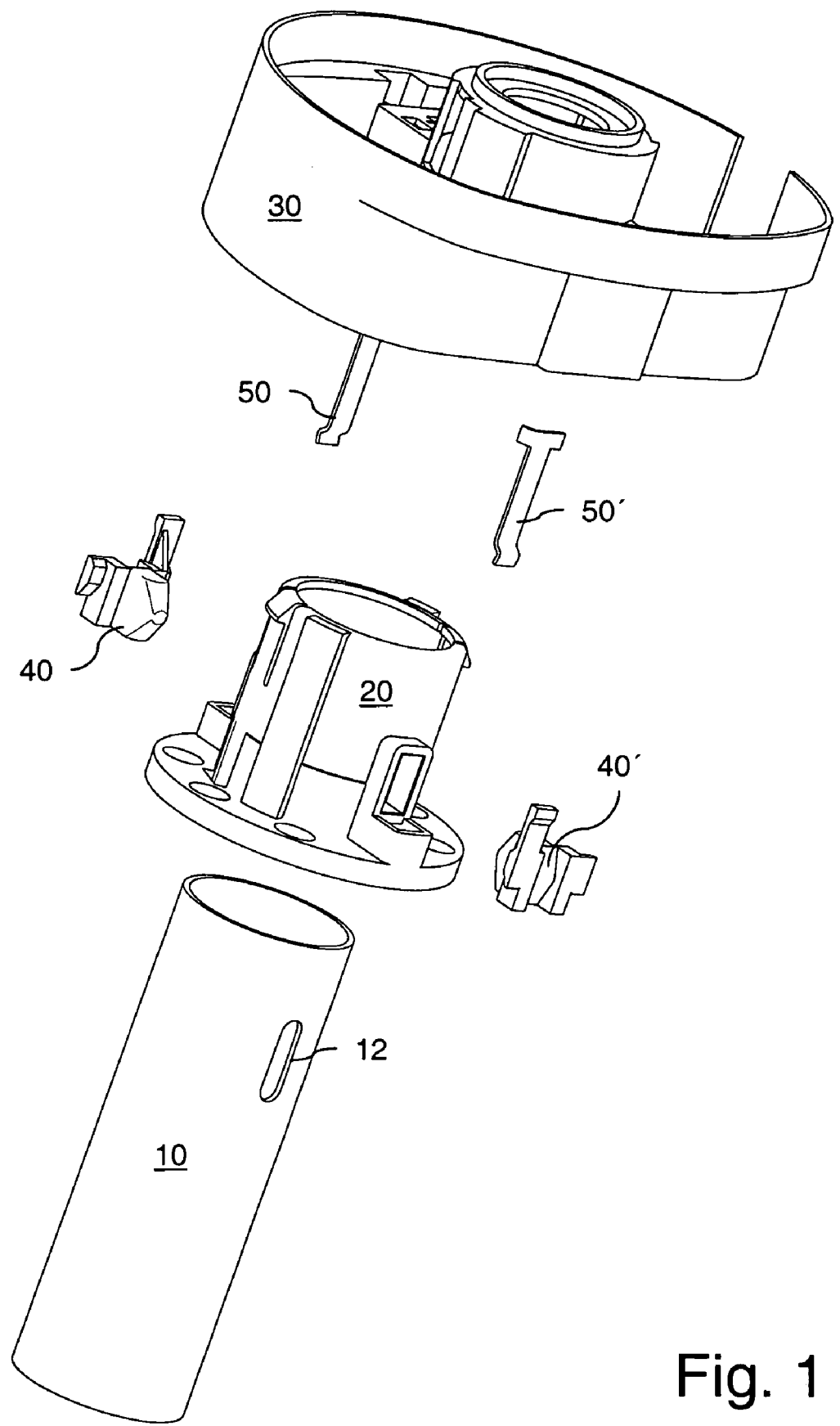

2007/0137377 A1* 6/2007 Kamei .................... 74/493
2007/0137378 A1* 6/2007 Bastein et al. ............ 74/493
2007/0151392 A1* 7/2007 Oshita et al. ............. 74/493
2007/0245845 A1* 10/2007 Ridgway et al. .......... 74/493
2007/0278777 A1* 12/2007 Liu et al. ................ 280/775

* cited by examiner

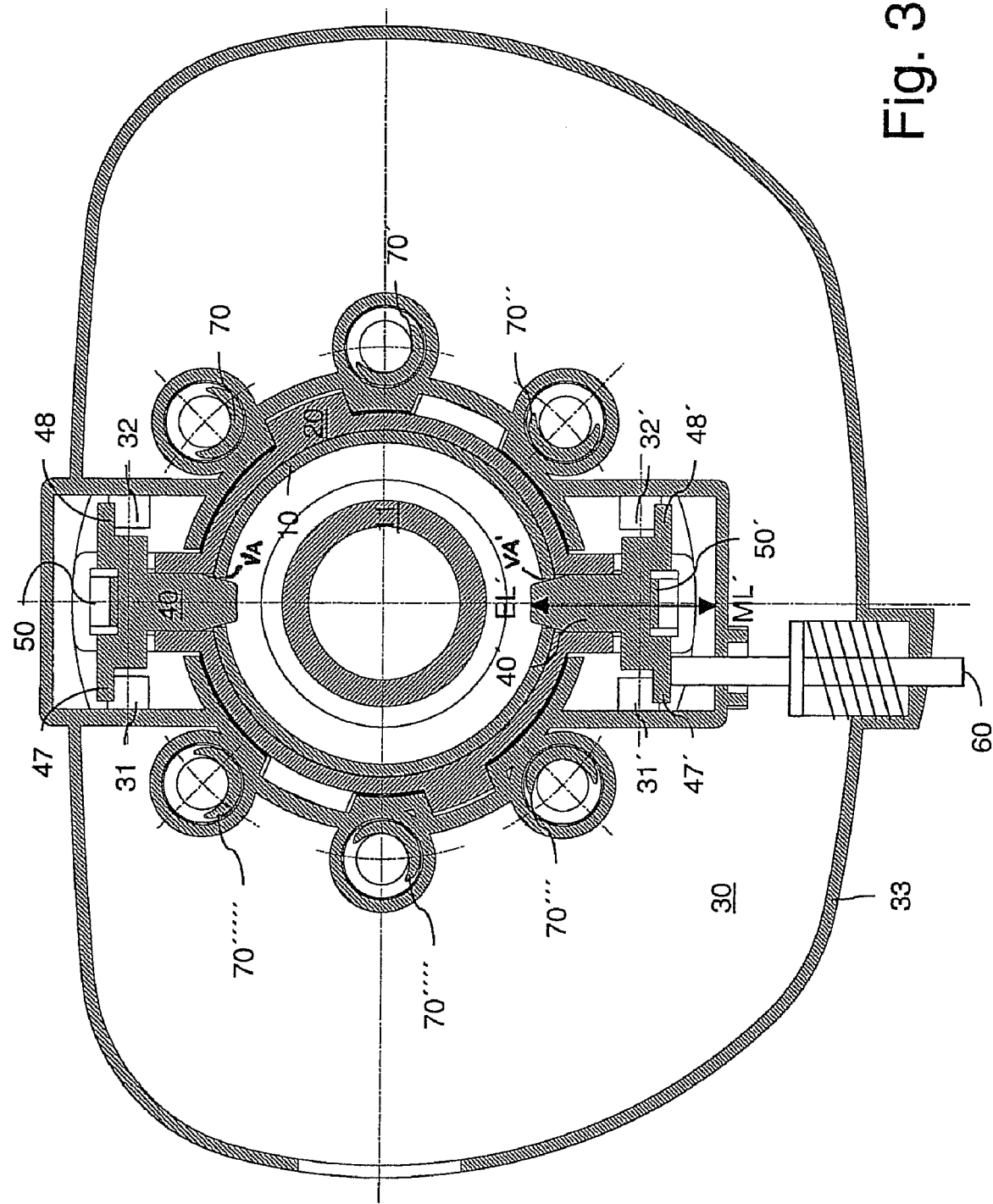

FASTENING DEVICE FOR A STEERING COLUMN MODULE OF A VEHICLE

DESCRIPTION

The invention concerns a fastening device for a steering column module of a vehicle with a housing bottom coupled to an essentially tubular fastening flange, which module is mounted on the steering column jacket of a steering spindle, and a fastening method for it.

Steering column modules are switch modules arranged in the region of the steering column jacket of the steering spindle of a vehicle and usually concentrically to it. Steering column modules carry steering column switches and the like, wherein, depending on the configuration, so-called CIM (column integrated modules) components, like a coil spring cassette, a steering angle sensor, etc., can also be parts of a steering column module.

A fastening device for a steering column module is known from DE 102 44 245 A1, having a clamping element to fasten the steering column module to the steering column jacket of the steering spindle of a vehicle. The clamping force is produced by relative movement between the steering column module and the steering column jacket. A drawback here is the difficult assembly and disassembly capability of the steering column module during production or for maintenance or repair purposes, which requires additional time and cost. Based on the frictionally engaged fastening strategy, the steering column module can easily slide during assembly, for which reason its precise alignment is difficult to achieve or correct. In addition, when the connection is loosened, parts can be damaged, which must be replaced in time-consuming and costly fashion.

The task of the invention is to provide a fastening device of the type just mentioned that permits easy and rapid assembly and disassembly of a steering column module and is simply and cost-effectively designed. Another task of the invention is to provide a corresponding method.

This task is accomplished according to the invention with a fastening device, in that the fastening flange has at least one radially movable arresting block, which engages in a corresponding radial recess of the steering column jacket in a fastening position of the fastening flange.

An essential advantage of this solution is that this forms the basis of a fastening strategy based on a locking mechanism. The fastening flange can be aligned by a mechanic easily on the steering column jacket, in which the arresting block is made to cover the corresponding recess in the steering column jacket, so that the position of the fastening flange is clearly established.

The arresting block expediently lies in the recess, so that rotation and axial displacement of the fastening flange against the steering column jacket is prevented. In another embodiment, the housing bottom acts in the fastening position, together with the fastening flange, so that the arresting block is blocked against sliding out of its engagement position by a safety stop. The arresting block preferably lies in the fastening position on the steering column jacket against a locking stop. The connection between the fastening flange and the steering column jacket is only secured by mounting or insertion, screwing, etc., of the housing bottom to the fastening flange, the arresting block being blocked against sliding out. A relatively easy disassembly of the connection is offered by reversal of the assembly sequence.

In an advantageous modification, the arresting block has slopes on the engagement side, arranged and dimensioned so that the arresting block, during assembly and disassembly of the fastening flange, is forced against the steering column jacket from its engagement position. On the one hand, mounting or insertion of the fastening flange on or in the steering column jacket is facilitated for a mechanic on this account. In addition, pulling of the fastening flange out of the fastening position on the steering column jacket is also simplified. In both cases, the arresting block is brought into an assembly position on the fastening flange by the outer surface of the steering column jacket, which permits easy guiding on the steering column jacket. The engagement side of the arresting block can then be designed arrow-like, in which the arrow slope on both sides preferably lies between 10° and 60°. The recess is formed as an elongated hole axially on the steering column jacket.

In another embodiment, two diametrically opposite arresting blocks are provided. An advantageous modification proposes a spring element, which is respectively assigned to an arresting block, and through which the arresting block is elastically forced into its engagement position. Because of this, engagement of the arresting blocks in the corresponding recesses in the form of elongated holes is supported and finding of the precise alignment of the steering column module (even under difficult assembly conditions) is facilitated for the mechanic. At the same time, the arresting block is held in the recess, so that easy mounting of the housing bottom is guaranteed. Spring mounting of the arresting blocks in the recesses also compensates for tolerances, because of radial play between the steering column jacket and the fastening flange.

The spring element is advantageously designed as a leaf spring on the housing bottom, which forces the corresponding arresting block elastically into its engagement position during joining of the housing bottom to the fastening flange. By integrating the spring elements in the housing bottom, the complexity of the fastening flange is reduced. By easy mounting of the housing bottom onto the fastening flange, a first pretension can already be applied to the arresting block, so that the aforementioned support of the mechanic in finding the recesses is guaranteed. Finally, the arresting blocks are exposed to the prescribed spring force during complete mounting of the housing bottom.

The leaf spring preferably covers one end side of the arresting block elastically, in order to force it from an assembly position to an engagement position. In principle, it is also possible to provide an arresting block with a through opening, in order to guide the corresponding leaf spring in it. However, the design complexity of the connection is increased on this account. The leaf spring, however, engages on the end side, which is designated as the side of the arresting block facing away from the engagement side, and no essential reconfiguration of the arresting block is necessary at this site.

The arresting block preferably has at least one slope on the end arranged and dimensioned so that the spring element is guided on the arresting block. Because of this, tilting of the spring element on the end side of the arresting block is prevented, which spring element is deflected in sliding fashion on the slope of the arresting block and pushes the arresting block from its assembly to its engagement position.

In a modification, it is provided that the spring element, in the fastening position of the housing bottom, lies against the fastening flange against a stop, so that its deflection is blocked and the arresting block is secured against sliding out of this engagement position. The spring element therefore integrates two functions, namely, elastic activation of the arresting block on the one hand, and its securing against undesired loosening of the connection on the other. If the spring element lies against the stop, it forms the safety stop against loosening of the corresponding arresting block from its engagement position on the steering column jacket. The dual function of the spring element simplifies design of the connection, since an additional safety stop separated from the spring element is unnecessary. At the same time, with an assembly process, namely, mounting of the housing bottom, the forming connection is created (forcing of the arresting blocks into the recesses) and secured (formation of a safety stop by locking of the spring elements).

According to an advantageous modification, the arresting block has at least one protrusion with slopes, which cooperates with a pin of the housing bottom, in order to force the arresting block to move from its engagement position during assembly and disassembly of the housing bottom on the fastening flange. Disassembly of the housing bottom from the steering column jacket is therefore significantly facilitated. During pulling off of the housing bottom from the fastening flange, the pins slide along the slopes of the protrusion, the slope of which is chosen so that the arresting blocks during this movement are pulled from their engagement position. A slope in a mirror image can be provided on the protrusion, in order to permit the pins to fit during mounting of the housing bottom (also with movement of the arresting blocks into their assembly position). A slope angle of the slopes between 10° and 60° is expediently provided.

An assembly pin is preferably assigned to at least one of the arresting blocks, which reproduces each movement of the arresting block and the position of the arresting block can be read on its position on an outside of the housing bottom. Because of this, optical and tactile checking of correct assembly of the steering column module on the steering column jacket from the outside is also possible, which is significant in terms of quality and safety In another variant, spring elements are provided, which, after loosening of the arresting block in the engagement position on the steering column jacket, force the housing bottom away from the fastening flange. Loosening of the housing bottom from the fastening flange, especially against the locking effect of the leaf springs, is facilitated significantly for the mechanic on this account. The housing bottom can be easily removed from the fastening flange and, as a result, this can be removed from the steering column jacket.

The task of the invention is also accomplished by a fastening method for a steering column module of a vehicle on a steering column jacket of a steering spindle, especially using the fastening device just described, in which the steering column module includes a fastening flange and a housing bottom that can be connected to it and, in a first step, a connection is produced between the fastening flange and the steering column jacket, free of rotation and displacement and, in a second step, a shape-mated connection between the housing bottom and the fastening flange is produced, which secures the first mentioned connection against undesired loosening.

A significant advantage of the fastening method consists of the decoupled two-stage connection (locking and securing connection), which can be easily loosened again by loosening of the second connection (disassembly of the housing bottom), without compromising the quality of alignment of individual parts or their loss through damage.

It is understood that the features mentioned above and still to be explained below are not only usable in the mentioned combination, but also in other combinations. The scope of the invention is only defined by the claims.

The invention is further explained below by means of an embodiment with reference to the accompanying drawings.

The same or equivalent parts are provided with the same reference numbers. In the drawings:

FIG. 1 shows an exploded view of a fastening device according to the invention,*

[The figures provided to the translator do not apply to this patent.]

Figure 2:
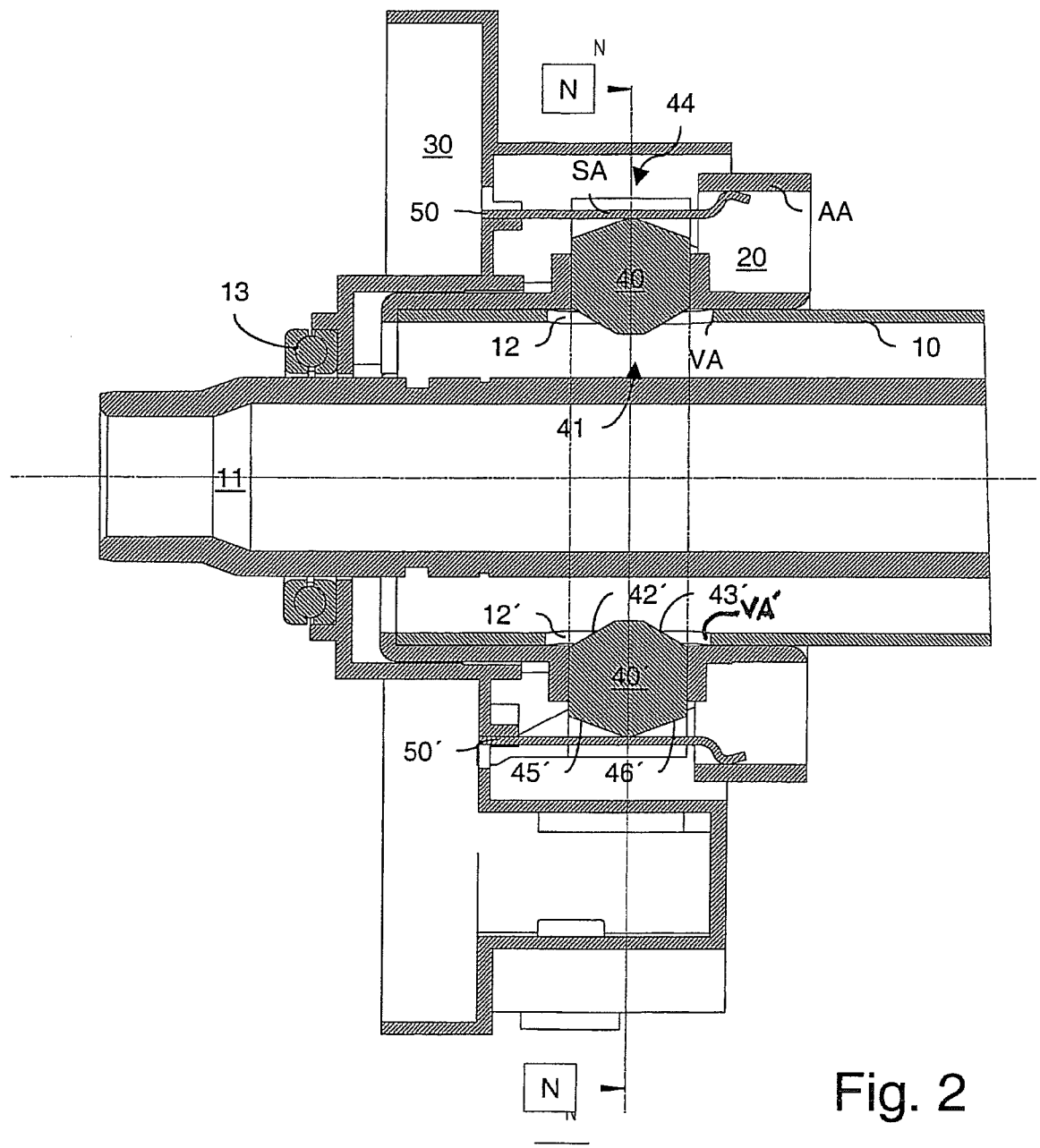

FIG. 2 shows an axially cut view of the fastening device according to FIG. 1 with a steering spindle, as well as its mounting, and FIG. 3 shows a cutaway top view of the fastening device according to FIG. 2 along line N-N.

A steering column module, comprising a fastening flange 20 and a housing bottom 30 connectable to it, is fastened on a steering column jacket 10 of a steering spindle 11 (FIGS. 2 and 3). After the fastening flange 20 is pushed onto the steering column jacket 30, arresting blocks 40, 40', which are held radially movable on the fastening flange 20, engage in recesses 12, 12' (FIG. 2) on the steering column jacket 10. The recesses 12, 12' are designed as elongated holes aligned in the axial direction to steering column jacket 10. Spring elements 50, 50', designed as leaf springs, slide when the housing bottom 30 is mounted on the fastening flange 20, the springs being connected to bottom 30 and elastically deflected via an end side 44, 44' (FIG. 2) of the arresting blocks 40, 40'. The spring elements 50, 50' force the arresting blocks 40, 40' into an engagement position EL, EL' (FIG. 3) with recesses 12, 12'. The steering column module is therefore secured against rotation and displacement on steering column jacket 10.

For clarity, the reference numbers in FIGS. 2 and 3 of radially symmetric components are only entered on one side.

In FIG. 2, the axial cutaway view of the fastening device according to FIG. 1 with the steering spindle 11 and its bearing 13 is shown. The left end of the steering spindle 11 carries the steering wheel, later to be installed. The fastening flange 20 and the housing bottom 30 are fastened to the steering column jacket 10 and the arresting blocks 40, 40' are situated against respective locking stops VA, VA' engaged with recesses 12, 12". An engagement side, 41, 41' of each arresting block 40, 40' has the slopes 42, 43, 42', 43', arranged arrow-like and dimensioned so that the corresponding arresting block 40, 40' is brought from its engagement position EL, EL' into an assembly position ML, ML' (FIG. 3) by pulling the housing bottom 30 from the fastening flange 20. Both arresting blocks 40, 40' are blocked against sliding out of the engagement position EL, EL' on their end sides 44, 44' against respective safety stops SA, SA', which is formed by the spring elements 50, 50', which again lie against respective spring locking stops AA, AA'. When housing bottom 30 is pulled from the fastening flange 20, the leaf springs 50, 50' which have been locked against the spring locking stops AA, AA' are released. They slide elastically along a slope 45, 45' over the end sides 44, 44' of each arresting block 40, 40'.

In the cutaway top view according to FIG. 3 of the fastening device according to FIG. 2 along the line N-N, pins 31, 32, 31', 32' of the housing bottom 30 are visible, which, in the fastened state of the steering column module, lie beneath protrusions 47, 48, 47', 48' of arresting blocks 40, 40', and force them from their engagement position EL, EL' with the recesses 12, 12' on the steering column jacket 10 into an assembly position ML, ML', so that the housing bottom 30 is released from the fastening clamps 20. Pulling off of the housing bottom is supported by the force of spring elements 70 to 70''''', which are pressed together in the mounted state of the steering column module and can expand during unlocking of arresting blocks 40, 40' from their engagement position EL, EL'. The corresponding position of arresting blocks 40, 40' and therefore securing of the fastening flange 20 on steering column jacket 10, can be controlled via a spring-mounted assembly pin 60, which reproduces each movement of the arresting block 40', and whose corresponding position is visible from the outside 33 of housing bottom 30.

The two-part design in fastening flange 20 and housing bottom 30 permits easy and rapid, wear-free and precise assembly and disassembly of the fastening device for a steering column module on the steering column jacket 10 of a vehicle. The fastening device is simply designed, so that it can be produced cost-effectively, for example, from plastic.

The invention claimed is:

1. A fastening device for a steering column module of a vehicle with a housing bottom coupled to an essentially tubular fastening flange, which module is fastened to a steering column jacket of a steering spindle, wherein the fastening flange has at least one radially movable arresting block, that, in a fastening position of the fastening flange, engages in an allotted radial recess of the steering column jacket;

wherein the arresting block, in the fastening position on steering column jacket, lies against a locking stop; and a spring element, extending substantially parallel to a longitudinal axis of the steering column jacket, is assigned to each arresting block, and through which the arresting block is elastically forced into its engagement position.

2. A fastening device according to claim 1, wherein the arresting block lies in the recess so that rotation and axial displacement of the fastening flange against steering column jacket is prevented.

3. A fastening device according to claim 1 wherein the housing bottom, in the fastening position, cooperates with the fastening flange, so that the arresting block is blocked against sliding out of its engagement position by a safety stop.

4. A fastening device according to claim 1, wherein the arresting block has slopes on the engagement side, which are arranged and dimensioned, so that the arresting block, during assembly and disassembly of the fastening flange on steering column jacket, is forced from its engagement position.

5. A fastening device according to claim 1, wherein two diametrically opposite arresting blocks are provided.

6. A fastening device according to claim 1, wherein the spring element is designed as a leaf spring on the housing bottom, which spring, during connection of housing bottom to fastening flange, acts on the corresponding arresting block.

7. A fastening device according to claim 6, wherein the leaf spring elastically encloses an end side of arresting block, in order to force it from its assembly position to the engagement position.

8. A fastening device according to claim 1, wherein the arresting block has at least one end side slope, arranged and dimensioned so that the spring element is guided on the arresting block.

9. A fastening device according to claim 1, wherein the spring element, in the fastening position of housing bottom, lies against a locking stop, so that its deflection is blocked and the arresting block is secured against sliding out of its engagement position.

10. A fastening device according to claim 1, wherein the arresting block has at least one protrusion that slopes, which cooperates with a pin of the housing bottom, in order to displace the arresting block from its engagement position during disassembly of the housing bottom from fastening flange.

11. A fastening device according to claim 1 wherein an assembly pin is assigned to at least one of the arresting blocks, which pin imitates the movement of the arresting block and the position of the arresting block can be read on its position on an outside of housing bottom.

12. A fastening device according to claim 1, wherein spring elements are provided, which, after loosening of the arresting block from the engagement position on steering column jacket, force the housing part from the fastening flange.

\* \* \* \* \*